United States Patent
Baral

(10) Patent No.: US 6,273,109 B1
(45) Date of Patent: Aug. 14, 2001

(54) CLEANING DEVICE FOR AUTOMOBILE BODIES

(76) Inventor: Karl-Heinz Baral, Gottlieb-Daimler-Str. 57, 71711 Murr (DE)

( * ) Notice: Subject to any disclaimer, the term of this patent is extended or adjusted under 35 U.S.C. 154(b) by 0 days.

(21) Appl. No.: 09/314,781

(22) Filed: May 19, 1999

(30) Foreign Application Priority Data

May 19, 1998 (DE) .............................................. 198 22 537

(51) Int. Cl.$^7$ ...................................................... B08B 3/02
(52) U.S. Cl. .................. 134/102.3; 134/123; 134/102.1; 134/104.2
(58) Field of Search .............................. 134/102.1, 102.2, 134/102.3, 104.2, 133, 123, 172, 181

(56) References Cited

U.S. PATENT DOCUMENTS

| | | | |
|---|---|---|---|
| 3,805,410 | * | 4/1974 | Rupp . |
| 3,808,698 | * | 5/1974 | Peters . |
| 4,106,429 | * | 8/1978 | Phillips . |
| 4,270,702 | * | 6/1981 | Nicholson . |
| 4,730,401 | * | 3/1988 | Machin . |
| 5,005,250 | * | 4/1991 | Trautmann et al. . |
| 5,144,754 | * | 9/1992 | Persson . |
| 5,367,739 | * | 11/1994 | Johnson . |
| 5,421,102 | * | 6/1995 | McElroy et al. . |
| 5,454,136 | * | 10/1995 | Gougoulas . |
| 5,456,023 | * | 10/1995 | Franan . |
| 5,661,912 | * | 9/1997 | Bhatnagar et al. . |
| 5,749,161 | * | 5/1998 | Jones . |
| 5,755,043 | * | 5/1998 | Belanger et al. . |
| 5,822,878 | * | 10/1998 | Jones . |
| 5,875,565 | * | 3/1999 | Bowman . |

FOREIGN PATENT DOCUMENTS

| | | | | |
|---|---|---|---|---|
| 1059020 | * | 1/1959 | (DE) | ..................................... 134/123 |
| 2203697 | * | 8/1973 | (DE) | ..................................... 123/123 |

* cited by examiner

Primary Examiner—Frankie L. Stinson
(74) Attorney, Agent, or Firm—Robert Becker & Assoc

(57) ABSTRACT

A cleaning device for automobile bodies has a cleaning chamber having a base structure and a roof structure. A transport device is provided on which vehicle bodies are transported in a transport direction through the cleaning chamber. The cleaning chamber has operating modules detachably connected to the base structure. The operating modules have lateral nozzle modules having lateral compressed air nozzles directing a stream of compressed air onto the vehicle bodies. The operating modules also have top nozzle modules having a top compressed air nozzle directing a stream of compressed air onto the automobile bodies. A vacuum device is provided for removing the compressed air from the cleaning chamber.

23 Claims, 7 Drawing Sheets

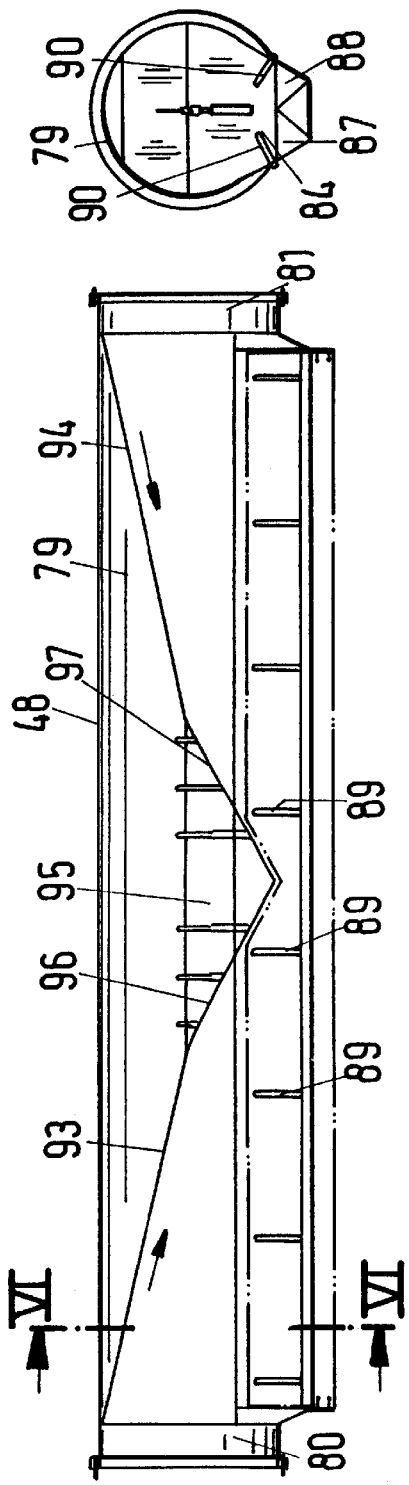
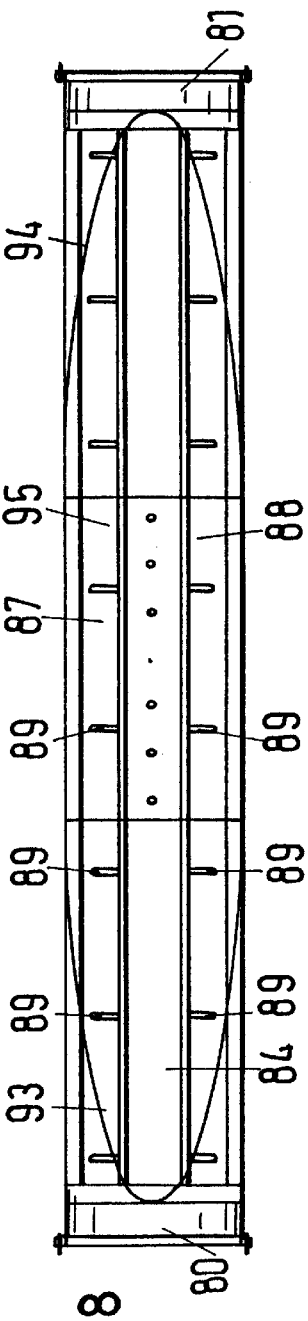
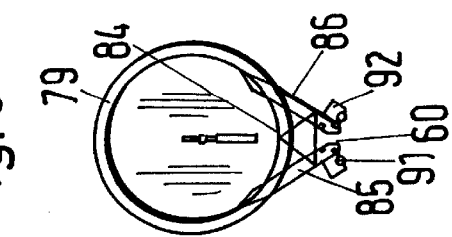

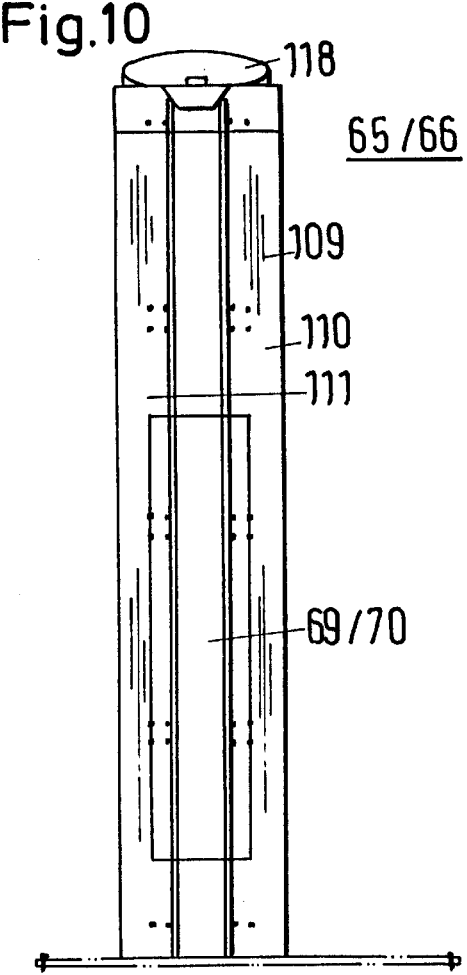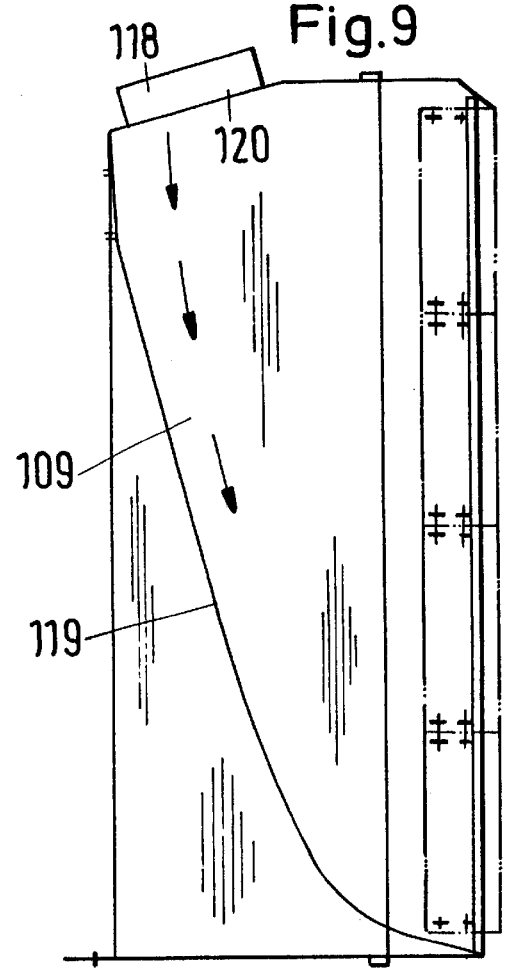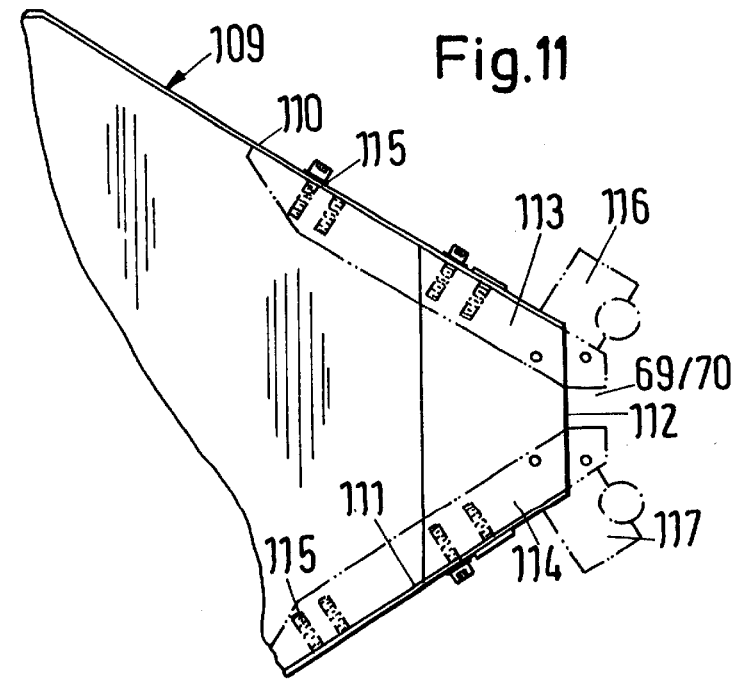

CLEANING DEVICE FOR AUTOMOBILE BODIES

BACKGROUND OF THE INVENTION

The present invention relates to a cleaning device for vehicle bodies, preferably of passenger cars and trucks, with at least one transport device for the car bodies which are transported through the cleaning chamber of the cleaning device and are subjected to a stream of compressed air. The stream of compressed air is supplied via at least one lateral compressed air nozzle and at least one top compressed air nozzle, and the cleaning device further comprises at least one vacuum device for removing the compressed air from the cleaning chamber.

In such cleaning devices the car body to be cleaned is transported on the transport device through the cleaning chamber of the cleaning device. The compressed air exiting from the lateral compressed air nozzle and the top compressed air nozzle removes dust and dirt particles from the car body which are then removed by the vacuum device. These cleaning devices with respect to the constructive design are matched to the respective application. This monolithic construction has the disadvantage that, for example, a design change, adaptation or extension of the cleaning device is not possible. For such cases, a new cleaning device must be mounted. As certain components of the cleaning device fail, the needed repairs of the cleaning device is very complicated and cumbersome.

It is therefore an object of the present invention to embody the cleaning device of the aforementioned kind such that it is of a constructively simple design and that it can be adapted without complications to special applications.

SUMMARY OF THE INVENTION

The inventive cleaning device is comprised of operating modules having correlated therewith the lateral compressed air nozzle as well as the top compressed air nozzle. The operating modules are connected in a detachable manner to a base structure. Because of the modular design, the cleaning device can be extended, changed or retrofitted as desired to certain car/vehicle body shapes or cleaning process variations. When a repair or exchange of components, i.e., operating modules of the inventive cleaning device is required, the respective operating module can be removed without problems from the base structure and can be replaced by another module.

BRIEF DESCRIPTION OF THE DRAWINGS

The object and advantages of the present invention will appear more clearly from the following specification in conjunction with the accompanying drawings, in which:

FIG. 5 shows a side view of the top compressed air nozzle of the inventive cleaning device;

FIG. 6 shows a section along the line VI—VI of FIG. 5;

FIG. 7 is a side view of the top compressed air nozzle;

FIG. 8 is a view of the nozzle opening of the top compressed air nozzle;

FIG. 9 is a side view of a lateral compressed air nozzle of the inventive cleaning device;

FIG. 10 is a front view of the lateral compressed air nozzle of FIG. 9;

FIG. 11 shows a plan view onto a portion of the lateral compressed air nozzle;

DESCRIPTION OF PREFERRED EMBODIMENTS

Figure 1:
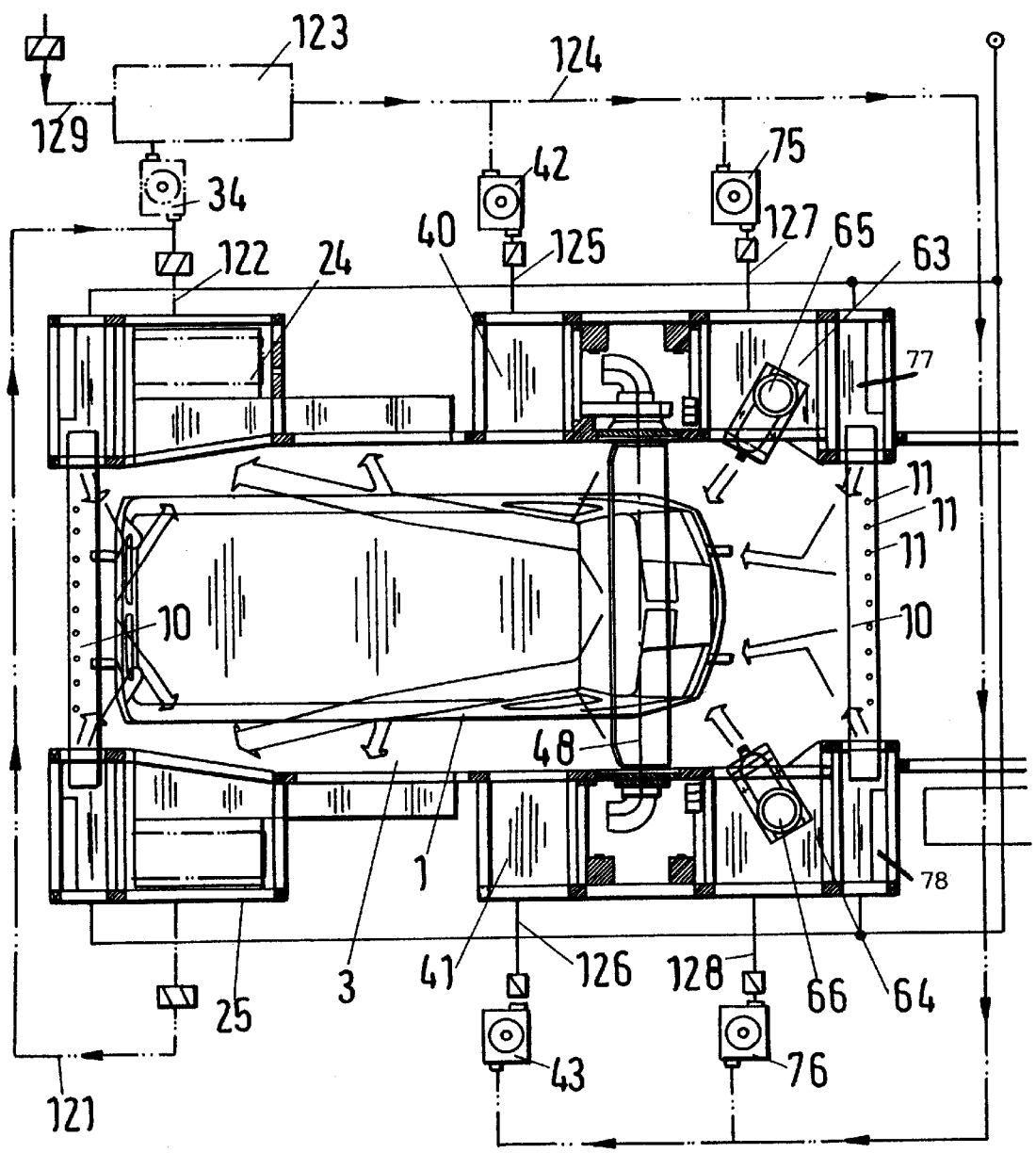
FIG. 1 shows a plan view of the inventive cleaning device, showing a car body to be cleaned inside of the cleaning device.
Figure 2:
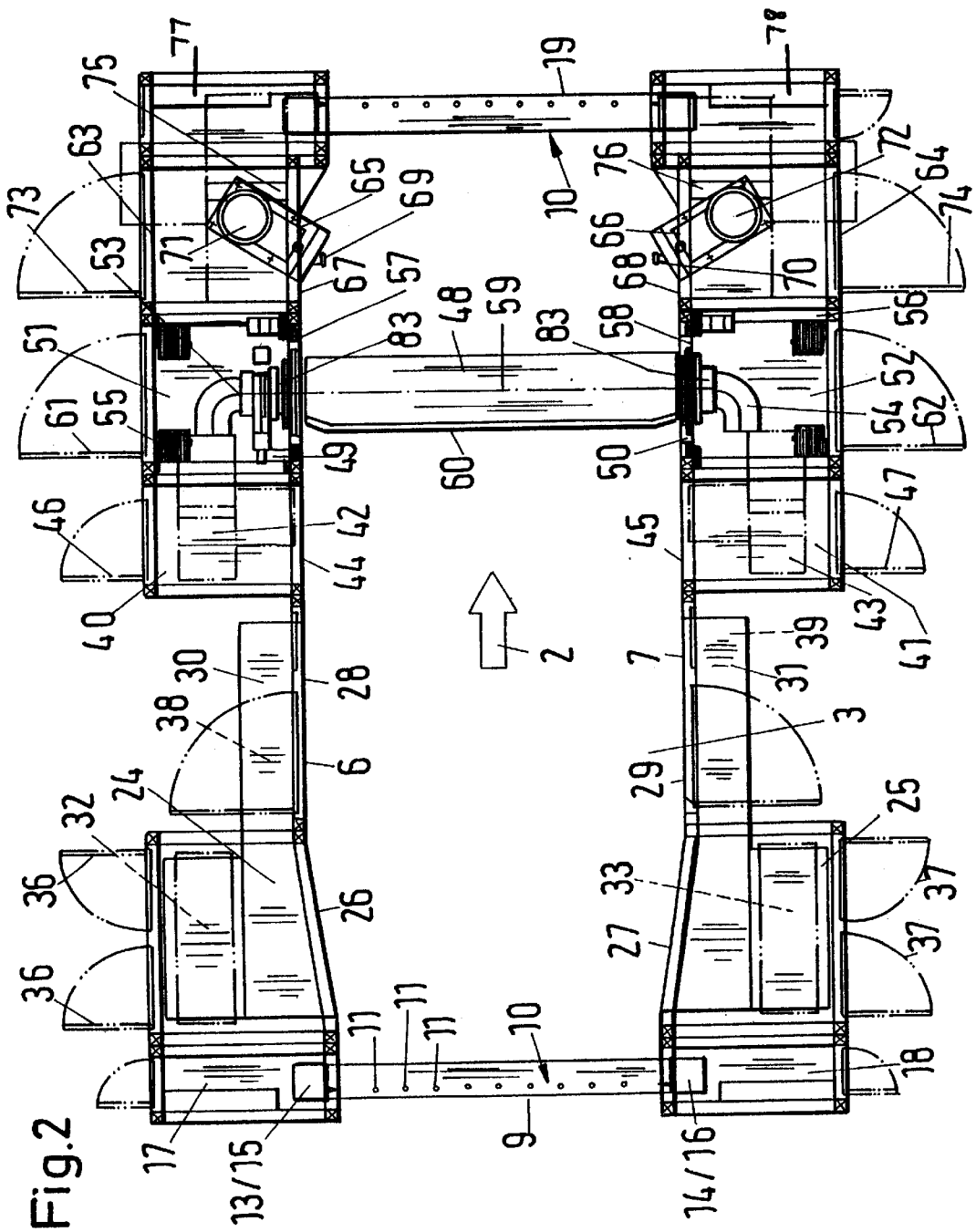
FIG. 2 shows a cleaning device according to FIG. 1 without the car body.
Figure 3:
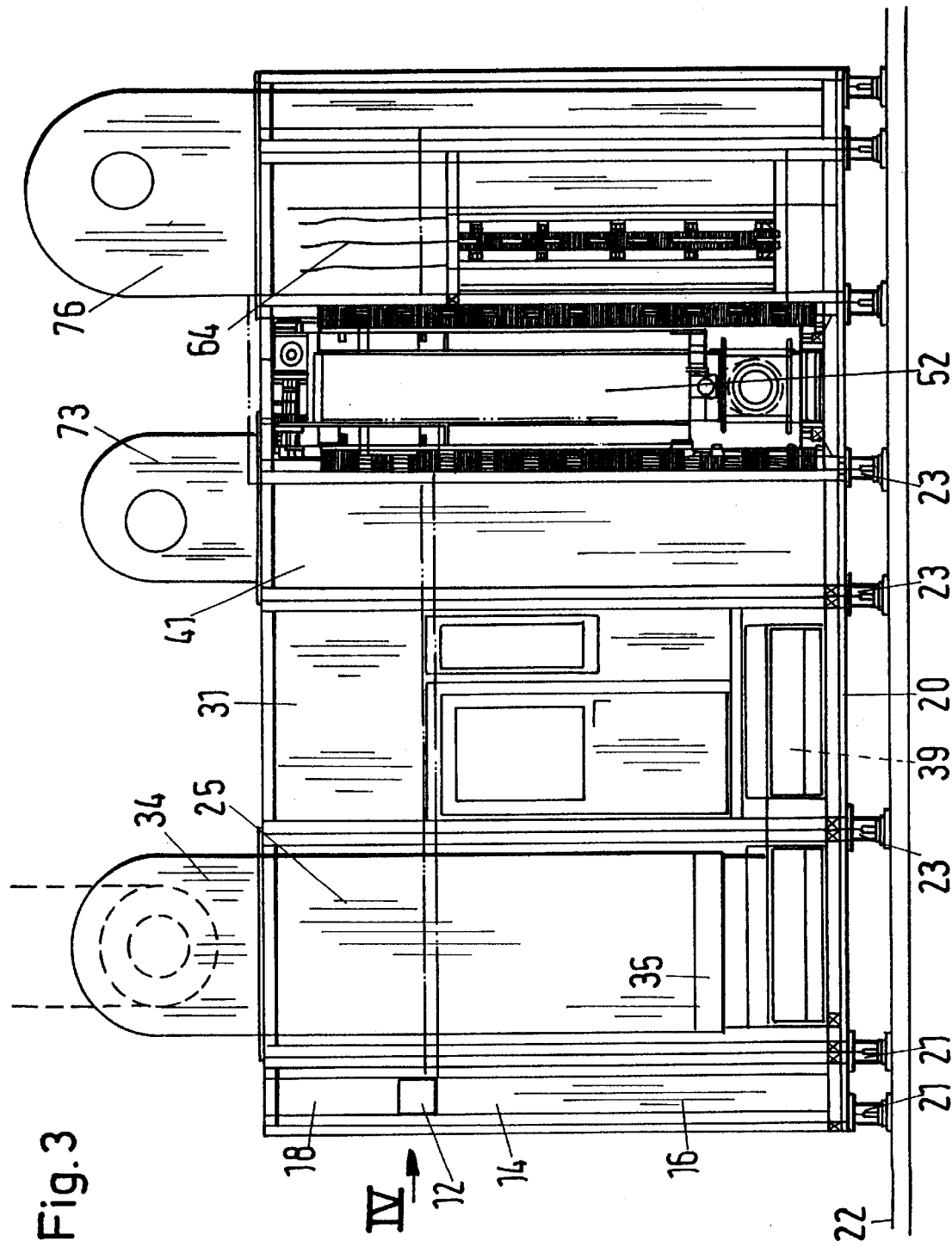
FIG. 3 shows a side view of the inventive cleaning device.
Figure 4:
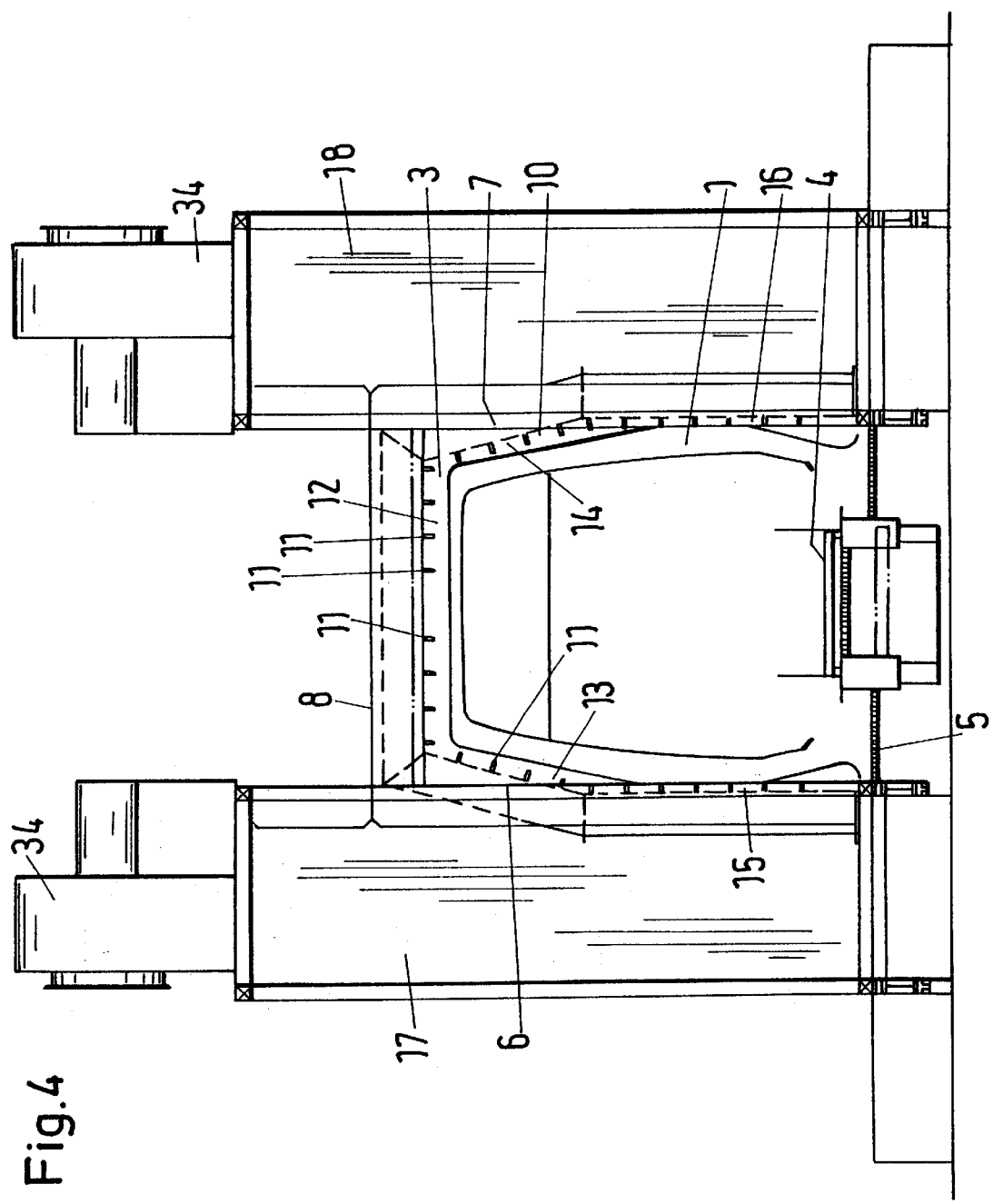
FIG. 4 shows a view in the direction of arrow III in FIG. 3.

The present invention will now be described in detail with the aid of several specific embodiments utilizing FIGS. 1 through 12. The cleaning device is designed to remove dirt, dust etc. from vehicle bodies such as passenger cars or trucks, before the car body is transported to further processing stations, for example, a painting station. The vehicle or body (FIG. 1) is transported by a suitable transport device 4 (FIG. 4) through the cleaning device in the direction of arrow 2 (FIG. 2). During transport through the cleaning device, the car body is subjected to compressed air which will remove the dirt and/or dust particles from the car body 1 and will entrain them in the resulting turbulent air stream so that the dirt and dust particles can be removed by vacuum (suction) from the cleaning chamber 3 of the cleaning device. The transport device 4 is schematically shown in FIG. 4. It is positioned close to the bottom 5 which delimits the cleaning chamber 3 of the cleaning device in the downward direction. Furthermore, the cleaning chamber 3 is delimited by sidewalls and a ceiling or roof structure 8. The end faces of the cleaning chamber 3 are open.

At the entrance 9 (FIG. 2) of the cleaning chamber 3 an air curtain device 10, comprised of a plurality of jets 11, is provided through which compressed air is ejected. The air exiting from the individual jets 11 forms an air curtain (indicated by arrows in FIG. 1) which covers substantially the entrance 9, when viewed in the transport direction. As can be seen in FIG. 1, it is oriented slightly inwardly into the cleaning chamber 3. This ensures that no dust or dirt can exit from the cleaning chamber 3 through the entrance 9. Advantageously, the jets 11 of the air curtain device 10 are adjustable so that the orientation of the exiting air streams can be optimized.

As is shown in FIG. 4, the air curtain device 10 is substantially U-shaped in an end view. It has a jet arrangement 12 which extends horizontally along the ceiling 8. At both ends of portion 12 downwardly extending and diverging jet arrangements 13, 14 are connected. These arrangements 13, 14 have connected thereto vertically extending jet arrangements 15, 16. The jet arrangements 12–16 are substantially positioned within lateral operating modules 17 and 18. Upon passing through the air curtain provided by the air curtain device 10, the vehicle body 1 is already subjected to an air stream that will remove dirt and dust particles upon entry into the cleaning chamber. The air is supplied at high pressure, for example, 6 bar, through the air curtain device 10 so that dirt and dust particles are effectively removed.

At the opposite exit 19 (FIG. 2) of the cleaning chamber 3 an identical air curtain device 10 is provided. Its jets 11 are adjusted such that the air is blown at a slant in the axial direction inwardly into the cleaning chamber (see arrows in FIG. 1). The compressed air exiting from the air curtain device 10 flows toward the car body to be cleaned. This air curtain, which when viewed in the transport direction 2, covers the exit 19 substantially completely also prevents that dirt and dust particles will exit from the cleaning room 3 to the exterior.

The two operating modules 17, 18 at the entrance are positioned opposite to one another and are arranged mirror-symmetrically to one another. They are of a parallelepipedal design and are positioned upright (FIG. 4) onto the base structure or frame 20 (FIG. 3). The frame 20 rests with its legs 21 on the ground surface 22. The legs 21 have advantageously adjusting screws 23 with which the base structure (frame) 20 can be adjusted continuously relative to the ground surface 22 in order to provide a vertical (height) adjustment.

Adjacent to the operating modules 17, 18 at the entrance, suction modules 24, 25 are provided (FIGS. 2 and 3). The suction modules 24, 25 have the same height as the operating modules 17, 18 positioned at the entrance. Their sidewalls 26, 27 (FIG. 2) extend in a diverging fashion (FIG. 2) relative to one another in the transport direction 2, whereby the sidewalls 26, 27 are planar and are arranged flush to the sidewalls 28, 29 of the oppositely arranged channel modules 30, 31 which are parallel to the transport direction The suction modules 24, 25, viewed in the transport direction 2, have a greater length than the modules 17, 18 at the entrance but are shorter than the channel modules 30, 31 arranged downstream. The sidewalls 28, 29 of the channel modules 30, 31 are also planar.

The suction modules 24, 25 comprise suction channels 32, 33 via which the dirt and dust particles contained in the compressed air are removed by blowers 34. Within the suction channels 32, 33 filters 35 (FIG. 3) are provided with which the dirt and dust particles are removed from the air stream.

The exterior side of the suction modules 24, 25 facing away from the cleaning chamber 3 are provided with at least one door 36, 37 so that the suction modules 24, 25 are accessible by the operator, i.e., the operator can walk in to make repairs or perform servicing tasks. The doors 3, 37 are safety doors which open only when the cleaning device is not operating.

The channel modules 30, 31 comprise also suction channels 38, 39 which are in communication with the respective suction channels 32, 33 in the suction modules 24, 25. It is thus possible to remove the air which contains dirt and dust particles from the cleaning chamber in an optimal manner. The suction modules 24, 25 and the channel modules 30, 31 have suction openings at the sidewalls 26, 27 and 28, 29 which open into the respective suction channels 32, 33 and 38, 39.

Downstream of the channel modules 30, 31, viewed in the transport direction 2, respective supply modules 40, 41 are provided on which respectively a blower 42, 43 is arranged. The supply modules 40, 41 are also of a parallelepipedal design and have advantageously the same height as the other modules (FIG. 3). The sidewalls 44, 45 (FIG. 2) facing the interior of the cleaning chamber 3 are planar and flush with respect to the sidewalls 28, 29 of the channel modules 30, 31. The supply modules 40, 41 are provided with at least one door 46, 47 at their exterior side facing away from the cleaning chamber 3. The doors 46, 57 are provided so that the operator can enter the respective module for servicing, maintenance, repairs etc. These doors 46, 47 are also embodied as safety doors which can be opened only when the cleaning device is shutdown. The mechanical, electrical and electronic components of the blowers 42, 43 are arranged within the supply modules 40, 41.

Via the blowers 42, 43 the compressed air is supplied to the top compressed air nozzle 48 which extends horizontally across the width of the cleaning chamber 3 and which is moveable in the Z direction by a computerized control. According to the shape of the car body 1 to be cleaned, the top compressed air nozzle 48 is moved in the vertical direction within the cleaning chamber 3. For this movement in the Z direction, the top compressed air nozzle 48 is supported with its two ends in slides 49, 50 which are mounted within a guide module 51, 52. They are also of a parallelepipedal shape and have advantageously the same height as the other operating modules. At both ends of the top compressed air nozzle 48 a supply line 53, 54 (FIG. 2) is provided for the compressed air via which the compressed air is supplied by blowers 42, 43 at high pressure to the top compressed air nozzle 48. The slides 49, 50 have counter weights 55, 56 correlated therewith which are mounted in the guide modules 51, 52 so that the slides 49, 50 can be moved with minimal force expenditure. The slides 49, 50 can be embodied in any suitable manner. It is possible to provide the two slides 49, 50 with gear wheels which engage vertically arranged toothed racks provided within the guide modules 51, 52. The guide modules 51, 52 have sidewalls 57, 58 facing the interior of the cleaning chamber 3, whereby the sidewalls 57, 58 have a vertically extending slot through which the ends of the top compressed air nozzle 48 project into the guide modules. These slots are dimensioned such that dirt and dust particles present within the cleaning chamber 3 during the cleaning process will not penetrate into the guide modules 51, 52.

The top compressed air nozzle 48 is advantageously rotatable about is longitudinal axis 59 so that the compressed air exiting from the slot-shaped nozzle opening 60 can be directionally adjusted with respect to the shape of the car body 1.

The guide modules 51, 52 have at their exterior sides, facing away from the cleaning chamber 3, a respective door 61, 62 through which the operator can enter the guide modules. The doors 61, 62 are safety doors so that during operation of the cleaning device the guide modules 51, 52 cannot be accessed; shut down of the cleaning device is required to open the doors 61, 62.

Downstream of the guide modules 51, 52 lateral nozzle modules 63, 64 are mounted which have advantageously the same height as the other operating modules. The lateral nozzle modules 63, 64 have lateral compressed air nozzle 65, 66 which penetrate through a slot in the sidewalls 67, 68 of the nozzle modules 63, 64 slightly into the cleaning chamber 3. The lateral compressed air nozzles 65, 66 extend at least over half the total height of the cleaning chamber, preferably over substantially the entire height. The lateral compressed air nozzles 65, 66 have a slot-shaped nozzle opening 69, 70 through which the compressed air is blown at a slant into the interior of the cleaning chamber 3 (FIG. 1). Advantageously, the lateral compressed air nozzles 65, 66 are pivotable about a vertical axle 71, 72 positioned within the lateral nozzle module 63, 64 so that the compressed air exiting from the nozzle openings 69, 70 can be adjusted to the shape of the respective car body 1. The lateral nozzle modules 63, 64 or the lateral compressed air nozzles 65, 66 can also be adjusted in the Y direction or can be embodied so as to follow contours. The lateral nozzle modules 63, 64 are provided at their exterior sides with respective safety doors 73, 74 via which the nozzle modules 63, 64 can be accessed for cleaning, servicing and/or repair purposes. The sidewalls 67, 68 of the lateral nozzle modules 63, 64 are also planar and positioned flush to the adjacently positioned planar sidewalls 57, 58 of the guide modules 51, 52.

A blower 75, 76 is positioned on the lateral nozzle modules 63, 64 for the purpose of supplying compressed air to the lateral compressed air nozzles 65, 66.

In the transport direction 2, are positioned downstream of the nozzle modules 63, 64 modules 77, 78 which support the air curtain device 10 at the exit. These operating modules 77, 78 are advantageously of the same height as the other operating modules.

All of the operating modules 17, 18; 24, 25; 30, 31; 40, 41; 51, 52; 63, 64 are fastened to the base structure (frame) 20, see FIG. 3, which is supported by legs 21 having adjusting screws 23 for optimally positioning the base structure 20 relative to the ground surface 22.

The top compressed air nozzle 48 (FIGS. 5 through 8) has a substantially cylindrical mantle 79 having at its two ends a respective flange 80, 81. The top compressed air nozzle 48 is detachably connected to counter flanges 82 (FIG. 13) which have respectively coordinated therewith a bearing tube 83. The two bearing tubes 83, as shown in FIG. 2, are supported at the slides 49, 50. The mantle 79 has a slot 84, extending substantially over its entire length (FIGS. 5 through 8) through which project two oppositely arranged strips 85, 86 (FIG. 6) positioned at a spacing to one another. They converge in the direction of their free ends and limit the slot-shaped nozzle opening 60 through which the compressed air enters the cleaning chamber 3. For fastening the identically embodied strips 85, 86, the mantle 79 has extensions 87, 88 (FIG. 7) projecting past the edges of the slot 84 which extend substantially straight external to the mantle 79 and are provided with longitudinal slots 89 spaced at substantially uniform spacing (FIGS. 5 and 8). They serve to receive the screws 90 (FIG. 7) with which the strips 85, 86 are fastened to the inner side of the extensions 87, 88. The longitudinal slots 89 extend perpendicularly to the longitudinal direction of the extensions 87, 88. Because of these longitudinal slots 89, the portions of the strips 85, 86 projecting past the extensions 87, 88 can be adjusted continuously. In this manner, the width of the nozzle opening 60 can be optimally adjusted. An ionization device 91, 92 is attached to each strip 85, 86 (FIG. 6) with which the compressed air, before entering the cleaning chamber 3, is ionized.

The compressed air is forced by the blowers 75, 76 via both ends of the top compressed air nozzle 48 in the direction of the arrows (FIG. 5) into the nozzle 48. In the top compressed air nozzle 48 two deflecting plates 93, 94 are provided which extend from the end flanges 80, 81 at a slant in the direction toward the slot 84, respectively, the nozzle opening 60. As is shown in FIGS. 5 and 8, the deflecting plates 93, 94 widen from their ends positioned at the flanges 80, 81 opposite the slot 84 in a continuous manner toward the inner diameter of the mantle 79. Between the two deflecting plates 93, 94 an intermediate piece 95 is inserted that, in a side view, has a triangular shape and deflecting surfaces 96, 97 positioned at an obtuse angle to one another. They (96, 97) are positioned relative to the deflecting plates 93, 94, in a side view, at an obtuse angle so that the compressed air is deflected in the direction toward the nozzle opening 60. The intermediate piece 95 projects with its tip into the vicinity of the nozzle opening 60. Because of the disclosed embodiment, it is ensured that the top compressed air nozzle 48 will eject the compressed air over its entire width of the nozzle opening 60 uniformly into the cleaning chamber 3 at high pressure so that the car body 1 to be cleaned is subjected optimally to this air flow.

The top compressed air nozzle 48 can be pivoted about its axis 59 so that the nozzle opening 60 opening into the cleaning chamber 3 can be positioned at different angles to the horizontal so as to blow compressed air into the interior at different angles.

The movability of the top compressed air nozzle 48 in the Z direction allows an optimal cleaning of the car body 1 by the compressed air stream. The respective rotary drive for the top compressed air nozzle 48 is known to a person skilled in the art and is therefore not disclosed in detail in this context. The rotary drive is also mounted, like the slides 49, 50, in the guide modules 51, 52 external to the cleaning chamber 3. In a non-represented embodiment, the top compressed air nozzle 48 can also be moved, counter to the transverse direction, in the X direction. This allows to increase the conveying velocity of the car body 1 through the cleaning device.

Figure 12:
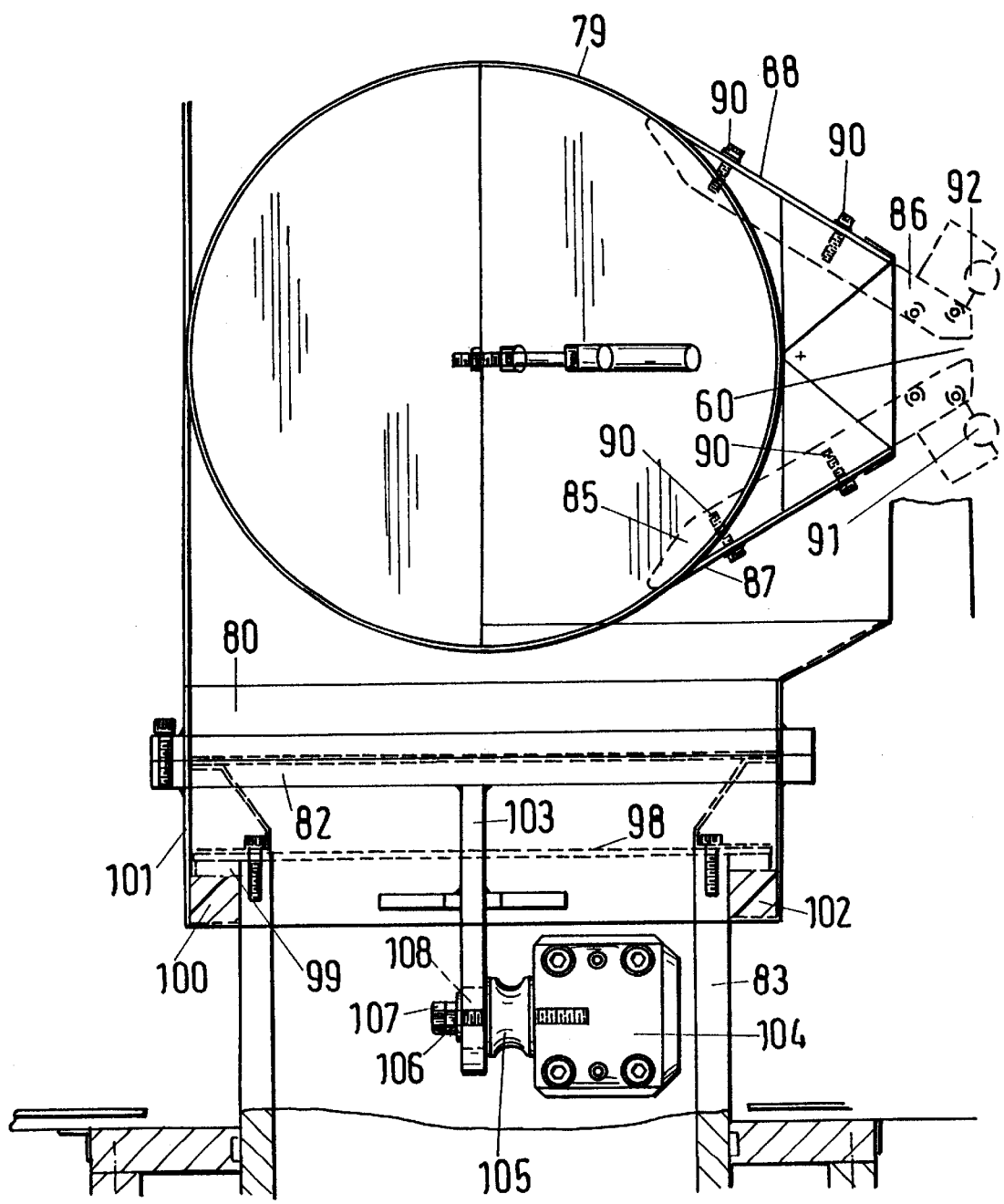
FIG. 12 shows a portion of the bearing arrangement of the top compressed air nozzle according to FIGS. 5 through 7.

For mounting of the top compressed air nozzle 48, a minimal axial play is provided in order to be able to bridge different spacings between the oppositely to one another arranged guide modules 51, 52 positioned oppositely to one another relative to the transport direction 2. At the free end of the bearing tube 83 a support 98 is detachably fastened which is embodied as a disc and has a greater diameter than the bearing tube 83 (FIG. 12). At the projecting part, a pressure ring 99 is positioned on the support 98 on which a sealing ring 100 is provided that is elastically deformed. It is positioned within a cylindrical piece 101 supported on the bearing tube 83. It is provided with a counter flange 82 which is fastened to the circumference of this intermediate piece 101. The intermediate piece 101 has a radially inwardly oriented flange 102 which rests at the exterior side of the bearing tube 83. The sealing ring 100 rests on the flange 102 under the force of pressure ring 99 and rests sealingly with its inner and outer side at the outer side of the bearing tube 83 and the inner side of the intermediate piece 101, respectively.

A stay 103 is fastened to the counter flange 82 which projects axially into the bearing tube 83 and with its free end is fastened at the holder 104 of the bearing tube 83 by interposition of a vibration damping element 105. It is seated on a threaded bolt 106 which is secured by a nut 107. The threaded bolt 106 penetrates through a slotted hole 108 of the stay 103. The intermediate piece 101 with a counter flange 82 can be moved relative to the bearing tube 83 over the length of the slotted hole 108 extending in the axial direction of the bearing tube 83 in order to compensate variations in the spacing between the two guide modules 51, 52.

The lateral compressed air nozzles 65, 66 are of a similar construction as the top compressed air nozzle 48. As can be seen in FIGS. 9 through 11, the lateral compressed air nozzles 65, 66 have a base body 109 which is provided with sidewalls 110, 111 which converge relative to one another. They are planar and delimit a continuous slot 112 extending over the height of the lateral compressed air nozzles 65, 66. At the sidewall of the lateral parts 110, 111, strips 113, 114 are fastened which are preferably embodied identically to the strips 85, 86 of the top compressed air nozzle 48. The strips 113, 114 are fastened by screws 115 at the inner side of the lateral parts 110, 111. The screws 115 project through non-represented longitudinal slots which extend perpendicularly to the longitudinal axis of the strips 113, 114. The strips 113, 114 project past the lateral parts 110 and 111, delimit the slot-shaped nozzle openings 69, 70. Due to the longitudinal slots in the side portions 110, 111 the projecting portions of the strips 113, 114 can be adjusted continuously by the lateral parts and thus the width of the nozzle openings 69, 70 can be adjusted. The strips 113, 114 are provided with ionization devices 116, 117 with which the compressed air exiting from the nozzle openings 69, 70 are ionized.

The two lateral compressed air nozzles 65, 66 have an upper connector 118 via which the compressed air is supplied by the blowers 75, 76. Within the base body 109 a guide wall 119 is provided which deflects the compressed air, supplied via the connector 118, at a slant in the downward direction. The guide wall 119 extends from the upper end of the lateral compressed air nozzles 65, 66 opposite the nozzle opening 69, 70 at a slant in the downward direction. The other end of the guide wall 119 is positioned at the level of the lower edge of the nozzle openings 69, 70 (FIG. 9). The connector 118 is positioned on a slantedly arranged portion 120 of the base body 109. This has the advantage that the compressed air flowing through the connector 118 is already at a slant in the direction toward the nozzle openings 69, 70 when entering the base body 109.

As can be seen in FIG. 1, the compressed air entraining dust and dirt particles will flow via lines 121, 122 from the suction modules 24, 25 toward the blower 34. Downstream of the blower a filter device 123 is arranged which will remove the dust and dirt particles from the compressed air and will also optionally humidify the air. The filter unit 123 can have a dry or wet filter. The compressed air is then guided via the line 124 to the blowers 42, 43 and 75, 76. From here, the compressed air flows via lines 125, 126 and 127, 128 to the supply modules 40, 41 and the lateral nozzle modules 63, 64. Furthermore, the compressed airflows into the air curtain devices 10 at the entrance and exit of the cleaning device. The compressed air is thus circulated so that energy consumption is reduced. Via line 129 exterior air may be supplemented to the filter unit 23 in order to compensate for pressure losses.

Since the cleaning chamber 3 is delimited by planar sidewalls 26, 28, 44, 57, 67, 27, 29, 45, 58, 68, within the cleaning chamber 3 no dust and dirt particles can be deposited. The smooth sidewalls ensure that dirt and dusts particles will reliably be transported to the suction modules 24, 25 and the channel modules 30, 31. In the area of the height-adjustable compressed air nozzles 48 as well as the pivotable lateral compressed air nozzles 65, 66, the nozzle openings in the sidewalls 57, 67, 58, 68 of the modules 51, 63, 52, 64 are substantially closed and planar. The devices required for driving the nozzles 48, 65, 66 are protected within the respective modules 51, 63, 62, 64 so that they cannot contribute to soiling of the cleaning chamber 3. In this manner, only a very minimal, negligible amount of dust and dirt will be present within the cleaning chamber 3 so that the cleaning chamber, even after prolonged use, will stay clean.

The jets 11 of the two air curtain devices 10 are advantageously adjustable such that the flow direction of the compressed air flow exiting therefrom is adjusted optimally relative to the car body 1 to be cleaned. As can be seen in FIG. 1, the jets 11 of the air curtain device 10 is adjusted such that the compressed air flows at an angle inwardly into the cleaning chamber 3. The air curtain device 10 at the entrance has the jets adjusted such that the total compressed air stream is oriented in the direction toward the suction modules 24, 25. The jets 11 of the air curtain device 10 at the exit are substantially adjusted such that the exiting compressed air is oriented in the direction of the car body 1. The lateral compressed air nozzles 65, 66 are adjusted such that the air flow exiting from the slot-shaped nozzle openings 69, 70 are positioned at a relatively steep angle to the car body 1.

Since the inner sides 26, 27 of the suction modules 24, 25 are positioned in a diverging direction relative to the transport direction 2, a very large effective entry surface for the compressed air laden with dust and dirt particles is provided so that the suction openings at the sidewalls 26, 27 will remove reliably the compressed air and the dirt particles through the suction module 24, 25. A portion of the compressed air, as is shown in FIG. 1, is removed via the channel modules 30, 35 having openings in the sidewalls 28, 29.

The top compressed air nozzle 48 can be rotated about its longitudinal axis 59 to end positions such that the compressed air exiting from the nozzle opening 60 flows in one end position horizontally and in the other end position vertically.

Since the entire cleaning device is embodied so as to be comprised of individual modules, the cleaning device can be adapted in any suitable manner to the respective desired application. The longitudinal dimensions of the cleaning device can therefore be simply changed by adding or removing modules. The modular design has also the advantage that individual modules can be replaced or exchanged for repair, or servicing or maintenance purposes. The individual modules can be arranged variably on the base structure 20 so that the cleaning device can be adapted with out problems to different applications. For example, it is possible to provide in addition to the two nozzle modules 63, 64 with the lateral compressed air nozzles 65, 66, further nozzle modules. Depending on the specifications received from the client, different modules are combined to form the cleaning device.

The movable top compressed air nozzle 48 is advantageously provided with a collision protection, so that there is no risk that the top compressed air nozzle could come into contact with the car body 1 to be cleaned. All of the operating modules are accessible from the exterior of the cleaning device so that repair or servicing operations can be simply carried out. For safety reasons the individual doors to the modules can only be opened when the cleaning device is shut down. The filters 35 in the suction modules 24, 25 are advantageously exchangeable so that they can be replaced, if necessary. The filters of the filter unit 123 are also advantageously exchangeable.

The specification incorporates by reference the disclosure of German priority document 198 22 537.7 of May 19, 1998.

The present invention is, of course, in no way restricted to the specific disclosure of the specification and drawings, but also encompasses any modifications within the scope of the appended claims.

What is claimed is:

1. A cleaning device for vehicle bodies, said cleaning device comprising:

a cleaning chamber (3) having a base structure (20) and a roof structure (8);

a transport device (4) on which vehicle bodies (1) are transported in a transport direction through said cleaning chamber (3);

said cleaning chamber (3) comprising operating modules detachably connected to said base structure (20);

said operating modules comprising lateral nozzle modules (63, 64) having lateral compressed air nozzles (65, 66) directing a stream of compressed air onto the vehicle bodies (1);

said operating modules further comprising top nozzle modules (51, 52) having a top compressed air nozzle (48) directing a stream of compressed air onto the vehicle bodies (1);

a vacuum device (24, 25) for removing the compressed air from said cleaning chamber (3).

wherein said operating modules comprise at least one suction module (24, 25) that is a part of said vacuum device, said at least one suction module (24, 25) having a sidewall (26, 27) that is positioned at a slant to said transport direction and forms a sidewall portion of said cleaning chamber (3) wherein said sidewall has at least one suction opening.

2. A cleaning device according to claim 1, wherein said operating modules further comprise at least one suction module (24, 25) that is a part of said vacuum device.

3. A cleaning device according to claim 2, wherein said operating modules (63, 64; 51, 52; 24, 25) are mounted flush to one another.

4. A cleaning device according to claim 3, wherein at least some of said operating modules have plane sidewalls (26, 27; 57, 58; 67, 68) providing sidewall portions of said cleaning chamber.

5. A cleaning device according to claim 2, wherein said operating modules are arranged in pairs opposite one another relative to said transport direction.

6. A cleaning device according to claim 1, wherein said top compressed air nozzle (48) is vertically adjustable.

7. A cleaning device according to claim 1, wherein said top compressed air nozzle (48) has a horizontal axis (59) and is adjustable about said horizontal axis.

8. A cleaning device according to claim 1, wherein said top compressed air nozzle (48) has a nozzle opening (60) having an adjustable width.

9. A cleaning device according to claim 1, wherein said top nozzle modules (51, 52) have supply lines connected to said top compressed air nozzle (48).

10. A cleaning device according to claim 1, wherein said top compressed air nozzle (48) is mounted in bearing tubes (83) and wherein said top compressed air nozzle (48) is axially moveable relative to said bearing tubes (83).

11. A cleaning device according to claim 1, wherein said lateral compressed air nozzles (65, 66) each have a vertical axis (71, 72) and are adjustable about said vertical axis (71, 72).

12. A cleaning device according to claim 1, further comprising air curtain devices (10) provided at an entrance and an exit of said cleaning chamber (3).

13. A cleaning device according to claim 12, wherein said air curtain devices (10) are comprised of adjustable air jets (11).

14. A cleaning device according to claim 13, wherein said air jets (11) of each one of said air curtain devices (10) are arranged in a U-shape.

15. A cleaning device according to claim 1, wherein said lateral compressed air nozzles (65, 66) each have an adjustable nozzle opening (69, 70).

16. A cleaning device according to claim 1, wherein said base structure (20) is a frame.

17. A cleaning device according to claim 1, wherein said base structure is vertically adjustable relative to the ground surface sais base structure (20) sits on.

18. A cleaning device according to claim 17, wherein said base structure (20) has legs with adjusting screws (23).

19. A cleaning device according to claim 1, further comprising blower units (32, 34, 42, 43, 75, 76) for introducing and removing compressed air into and from said cleaning chamber (3).

20. A cleaning device according to claim 1, wherein said lateral compressed air nozzles (65, 66) each have a horizontal axis and are adjustable about said horizontal axis perpendicularly to said transport direction.

21. A cleaning device for vehicle bodies, said cleaning device comprising:
   a cleaning chamber (3) having a base structure (20) and a roof structure (8);
   a transport device (4) on which vehicle bodies (1) are transported in a transport direction through said cleaning chamber (3);
   said cleaning chamber (3) comprising operating modules detachably connected to said base structure (20);
   said operating modules comprising lateral nozzle modules (63, 64) having lateral compressed air nozzles (65, 66) directing a stream of compressed air onto the vehicle bodies (1);
   said operating modules further comprising top nozzle modules (51, 52) having a top compressed air nozzle (48) directing a stream of compressed air onto the vehicle bodies (1);
   a vacuum device (24, 25) for removing the compressed air from said cleaning chamber (3);
   wherein said operating modules comprise at least one suction module (24, 25) that is a part of said vacuum device, said at least one suction module (24, 25) having a sidewall (26, 27) that is positioned at a slant to said transport direction and forms a sidewall portion of said cleaning chamber (3), wherein said sidewall has at least one suction opening, and wherein said operating modules other than said at least one suction module (24, 25) have sidewalls (57, 58; 63, 64) extending parallel to said transport direction.

22. A cleaning device for vehicle bodies, said cleaning device comprising:
   a cleaning chamber (3) having a base structure (20) and a roof structure (8);
   a transport device (4) on which vehicle bodies (1) are transported in a transport direction through said cleaning chamber (3);
   said cleaning chamber (3) comprising operating modules detachably connected to said base structure (20);
   said operating modules comprising lateral nozzle modules (63, 64) having lateral compressed air nozzles (65, 66) directing a stream of compressed air onto the vehicle bodies (1);
   said operating modules further comprising top nozzle modules (51, 52) having a top compressed air nozzle (48) directing a stream of compressed air onto the vehicle bodies (1), wherein said top compressed air nozzle (48) has a nozzle opening (60) having an adjustable width, said nozzle opening (6) delimited by strips (85, 86) positioned at a slant to one another, wherein said strips (85, 86) are adjustable relative to one another for adjusting said width of said nozzle opening (60); and
   a vacuum device (24, 25) for removing the compressed air from said cleaning chamber (3).

23. A cleaning device for vehicle bodies, said cleaning device comprising:
   a cleaning chamber (3) having a base structure (20) and a roof structure (8);
   a transport device (4) on which vehicle bodies (1) are transported in a transport direction through said cleaning chamber (3);
   said cleaning chamber (3) comprising operating modules detachably connected to said base structure (20);
   said operating modules comprising lateral nozzle modules (63, 64) having lateral compressed air nozzles (65, 66)

directing a stream of compressed air onto the vehicle bodies (1), wherein said lateral compressed air nozzles (65, 66) each have an adjustable nozzle opening (69, 70), each one of said nozzle openings (69, 70) delimited by strips (113, 114) positioned at a slant to one another, wherein said strips (113, 114) are adjustable relative to one another for adjusting said width of said nozzle openings (69, 70);

said operating modules further comprising top nozzle modules (51, 52) having a top compressed air nozzle (48) directing a stream of compressed air onto the vehicle bodies (1); and a vacuum device (24, 25) for removing the compressed air from said cleaning chamber (3).

* * * * *